United States Patent
Hauck et al.

(10) Patent No.: US 8,307,939 B2
(45) Date of Patent: Nov. 13, 2012

(54) STEERING GEAR

(75) Inventors: Michael Hauck, Remshalden (DE); Helmut Bareis, Eschach (DE); Wilfried Doster, Waldstetten (DE)

(73) Assignee: ZF Lenksysteme GmbH, Schwaebisch Gmuend (DE)

( * ) Notice: Subject to any disclaimer, the term of this patent is extended or adjusted under 35 U.S.C. 154(b) by 0 days.

(21) Appl. No.: 13/068,968

(22) Filed: May 25, 2011

(65) Prior Publication Data

US 2011/0278089 A1    Nov. 17, 2011

Related U.S. Application Data

(63) Continuation of application No. PCT/EP2009/064514, filed on Nov. 3, 2009.

(30) Foreign Application Priority Data

Nov. 26, 2008 (DE) .......................... 10 2008 044 079

(51) Int. Cl.
   *B62D 5/04* (2006.01)
   *F16H 1/04* (2006.01)
(52) U.S. Cl. ............ 180/443; 180/444; 74/422; 74/498; 74/594
(58) Field of Classification Search .................. 180/443, 180/444; 74/422, 498, 594
   See application file for complete search history.

(56) References Cited

U.S. PATENT DOCUMENTS

| | | | |
|---|---|---|---|
| 4,189,955 A | * | 2/1980 | Bishop .............................. 74/498 |
| 4,224,833 A | * | 9/1980 | Jablonsky ........................ 74/422 |

FOREIGN PATENT DOCUMENTS

| | | |
|---|---|---|
| DE | 28 30 772 | 1/1980 |
| DE | 44 22 559 | 7/1995 |
| DE | 103 44 734 | 5/2005 |

(Continued)

OTHER PUBLICATIONS

Anonym: "Berechnung der Keilwellenverbindungen" Internet Artikel, [online] Sep. 28, 2008, XP002565015 Retrieved from the Internet: URL:http://diglib.ethz.ch/system/temporary/get_wnv.ind9.search2331.htm> [retrieved on Jan. 25, 2010] p. 2-p. 3, paragraph 1—figures Bild, (B019wnvZ), auf, Seite 3.

Digital-Detective.Co.US:: "WebDateTM Zeitstempel zum Veroeffentlichungsdatum des Dokuments: "Berechnung der Keilwellenverbindungen" XP002565015" WebDate, Jan. 25, 2010, XP002565016 *using WebDate software version 1.0, provided by Digital Detective*.

*Primary Examiner* — Lesley D Morris
*Assistant Examiner* — Marlon Arce
(74) *Attorney, Agent, or Firm* — Jordan and Hamburg LLP

(57) ABSTRACT

Disclosed is a steering gear for a power steering system of a vehicle, comprising a component that is mounted axially displaceably in a housing of the steering gear, a tie rod fixed in an articulated manner on at least one axial end of the component by way of a joint, wherein a rotational center of the joint is disposed on a radially directed adapter part laterally offset with respect to a central longitudinal axis of the axially displaceable component, and the adapter part is fixed to the axially displaceable component by way of a shaft-hub connection, which is fastened on the axial end of the axially displaceable component using a nut on an external thread so as to provide a steering gear that has a high-strength, play-free connection between the axially displaceable component thereof and the adapter part, and which is easy to produce, the shaft-hub connection being formed by a play-free, conical serrated connection.

17 Claims, 2 Drawing Sheets

FOREIGN PATENT DOCUMENTS

| | | |
|---|---|---|
| FR | 28 32 973 | 6/2003 |
| JP | 60-038260 | 2/1985 |
| JP | 60-152827 | 10/1985 |
| JP | 2005-125975 | 5/2005 |

\* cited by examiner

STEERING GEAR

BACKGROUND OF THE INVENTION

The invention relates to a steering gear for a power steering system of a vehicle, comprising a component that is mounted axially displaceably in a housing of the steering gear.

Steering gears for power steering systems of vehicles are known in which, notably, a toothed rack forms an axially displaceable component that is installed transversely to the longitudinal vehicle axis, wherein tie rods are fixed in an articulated manner to both axial ends of the toothed rack. Steering gears are known from DE 4422 559 A1 and FR 2832973 B1, which disclose design solutions for improving the arrangement of the steering gear or the toothed rack in relation to a potential interfering contour of the vehicle, in particular the vehicle engine, from a steering kinematics point of view. For this purpose, the published prior art proposes to laterally offset the rotational center of the joint or ball joint of each tie rod on the toothed rack relative to the central longitudinal axis thereof by a radial extension. In this way, the movement path of the ball joints on the toothed rack side can be further from the toothed rack, which is to say the position of the ball joints is substantially independent of the installation position of the toothed rack. The radial extension is formed by an adapter part, and by means of a sleeve-like part integrally molded thereon having an opening region with a non-circular cross-section, the adapter part is disposed on the correspondingly opposite non-circular end of the toothed rack, wherein, according to a particular embodiment, the sleeve-like part of the adapter part is held non-positively on the toothed rack by means of a screw that can be screwed into a threaded bore of the toothed rack on the end face.

The adapter part can only be produced with high manufacturing expenditure. In addition, there are limited design options for the proposed fastening screw for the adapter part, because a radial wall is required on the toothed rack. The proposed conical shaft-hub connection between the toothed rack and the adapter part is weakened by the necessary internal thread.

Steering gears are known in which the adapter part on the toothed rack is formed by a screw connection, which is fastened by an end of the toothed rack designed as a threaded bolt on which a nut is fixed. These screw connections have a complex design.

SUMMARY OF THE INVENTION

It is the object of the invention to provide a steering gear that comprises a high-strength, play-free connection between the axially displaceable component thereof and the adapter part, and which is easy to produce.

By fixing the adapter part to the axially displaceable component by way of a shaft-hub connection, which is designed as a conical serrated connection and is fastened on one or both axial ends of the axially displaceable component using a nut on an external thread, a connection of the adapter part to the axially displaceable component is created, which is able to absorb high radial forces and bending moments, and is easier to produce. The external thread allows for considerably higher preload forces to be generated than with known steering gears.

Preferred embodiments will be apparent from the dependent claims.

The serration can be produced on the axially displaceable component by hobbing, and on the adapter part the serration can be produced by broaching and drifting, making it possible to create a very secure, positionally accurate connection between the adapter part and the axially displaceable component.

It is advantageous to dispose a disk between the nut and a face of the adapter part on the nut side. The cone in the region of the catchment of the shaft-hub connection preferably has an angle of 1.5° to 2°, but can extend up to a value as high as that described in DIN 254, which is approximately 5.7°. The entire connecting region between a housing of the steering gear over the adapter part to an end of the tie rod is advantageously enclosed by a sealing element, such as a bellows, and thus protected against the accumulation of dirt.

Instead of one bellows, it is also conceivable to use two bellows, for each axial end of the toothed rack or of the axially displaceable component, by guiding one bellows from the housing of the steering gear to a shaft on the adapter part on the shaft-hub connection, and by guiding another bellows from a flange on the joint of the tie rod on the adapter part, so as to extend over the tie rod shaft, so that the adapter part itself remains substantially unprotected. The joint between the adapter part and the tie rod is advantageously designed as a ball joint. The steering gear according to the invention is suitable for a power-assisted or servo steering system of a motor vehicle.

The invention will now be described in more detail based on an exemplary embodiment and is illustrated based on the accompanying drawings.

DESCRIPTION OF THE PREFERRED EMBODIMENTS

Figure 1:
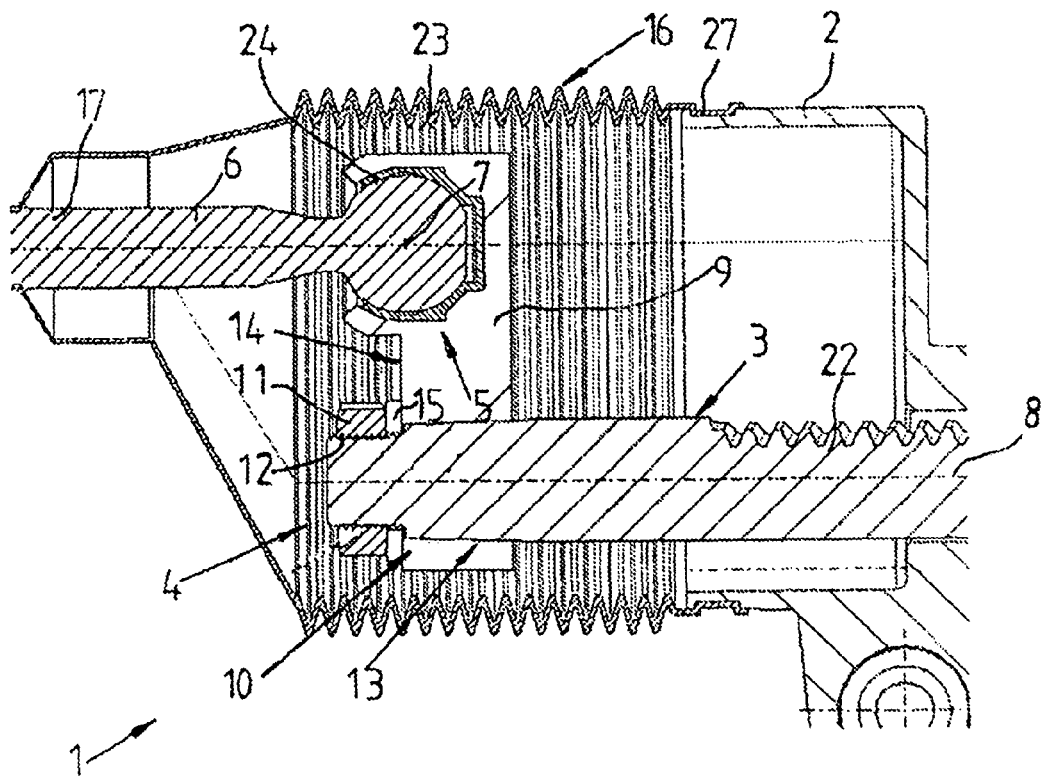
FIG. 1 is a partial schematic longitudinal section of a steering gear according to the invention.

FIG. 1 shows a partial schematic longitudinal section of a steering gear 1, including the housing 2 thereof, in an electric power-assisted steering system of a passenger car. Only an end region of the housing 2 is shown, in which an axially displaceable component 3 is mounted, which is designed as a toothed rack 22. On an axial end 4 of the toothed rack 22, an adapter part 9 is fixed positively detachably with a shaft-hub connection 10 and forms an elbowed, laterally directed extension of the toothed rack 22.

Figure 2:
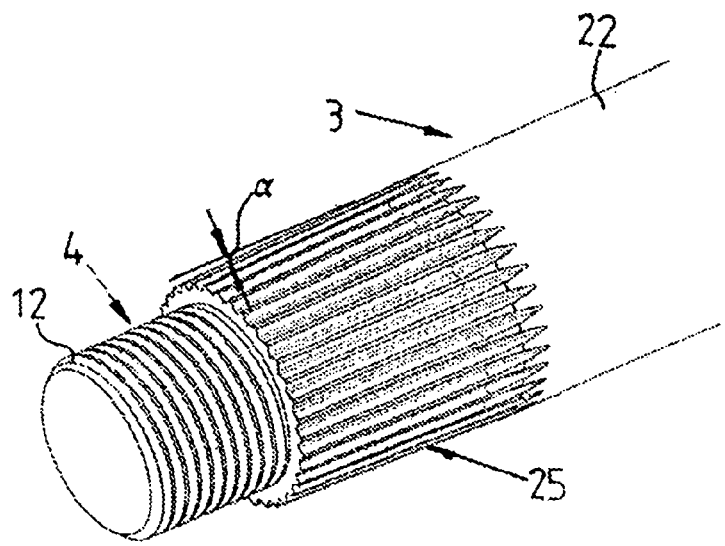
FIG. 2 is a perspective view of an axial end of an axially displaceable component comprising a shaft-hub connection according to the invention.
Figure 3:
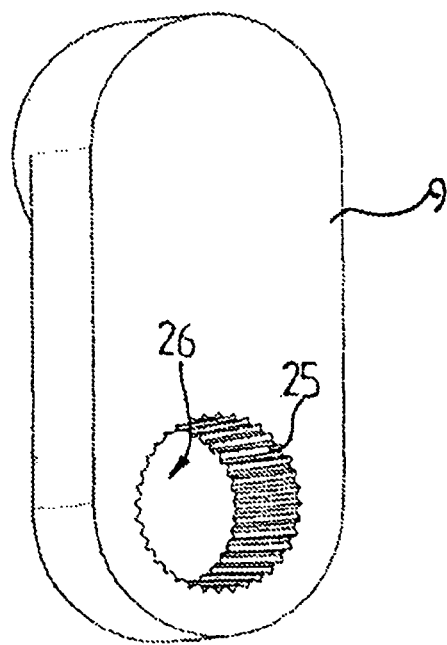
FIG. 3 is a perspective view of an adapter part comprising a shaft-hub connection according to the invention.

As is shown in FIG. 2 in a perspective view of the axial end 4 of the toothed rack 22, the shaft-hub connection 10 is designed as a conical serrated connection 13, wherein a serration 25 formed by hobbing, and having a cone angle α of 1.5°, is arranged on the end 4. Using a conical serration formed by broaching and drifting, located in an opening 26 of the adapter part 9 (see FIG. 3), and an external thread 12 onto which a nut 11 is screwed, this connection allows the two parts to be securely connected. The external thread 12 can be selected to be considerably larger than the internal thread known from the prior art, and is therefore able to generate considerably higher preload forces, which can be twice as high as those found with steering gears known from the prior art. The conical serrated connection 13 additionally allows for finely graduated adjustment of the rotational position of the adapter part 9, with respect to the center longitudinal axis 8 of the toothed rack 22.

Figure 4:
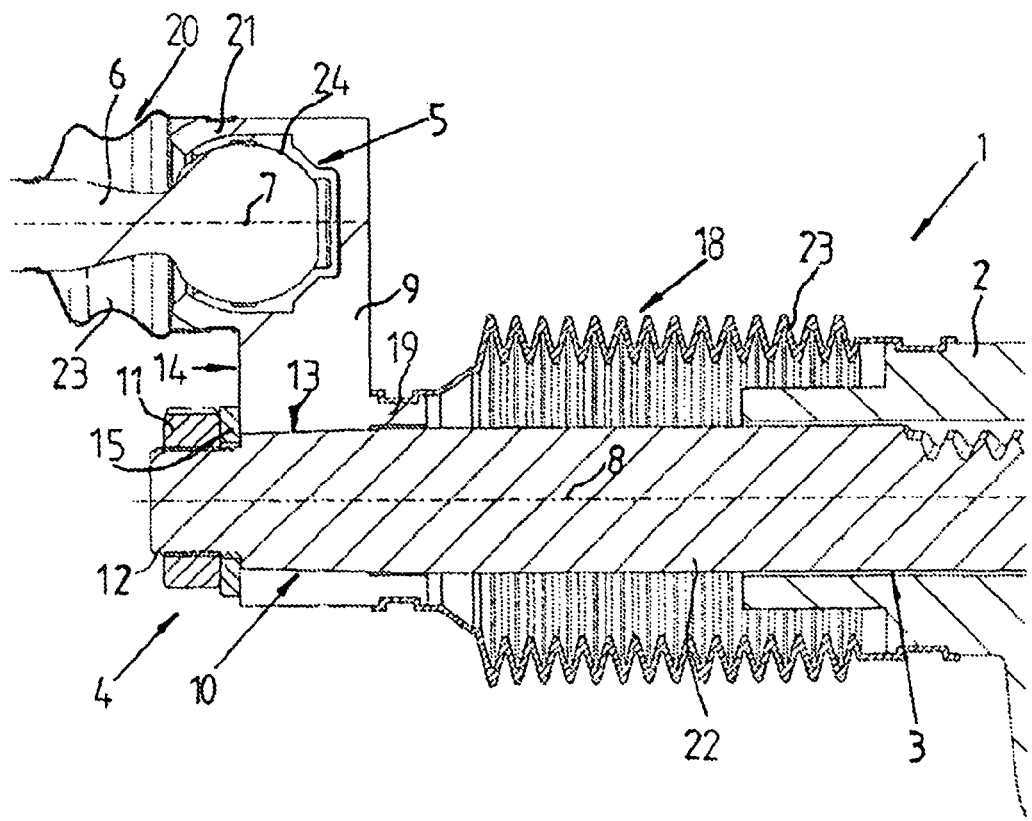
FIG. 4 is a further partial schematic longitudinal section of a steering gear according to the invention.

As shown in FIGS. 1 and 4, a tie rod 6 is connected to the adapter part 9 for the articulated connection of the toothed rack 22 to a steering arm of a steered wheel of the vehicle, by way of a joint designed as a ball joint 24. The rotational center 7 of the tie rod 6 is radially offset from the center longitudinal axis 8 of the toothed rack 22. A disk 15 is fixed between a face 14 of the adapter part 9 and the nut 11.

FIG. 1 shows an exemplary embodiment of the steering gear 1, which, via a single sealing element 16, which is a bellows 23 extending from the housing 2 of the steering gear 1 to tie rod shaft 17, protrudes beyond the entire surface of the adapter part at a distance, and prevents substances of all types from infiltrating into the housing 2 of the steering gear 1. The sealing element 16 is held by way of retaining straps 27 in a circumferential groove of the housing 2, and on the tie rod shaft 17.

The exemplary embodiment in FIG. 4 shows a sealing element 18, which only extends from the housing 2 of the steering gear 1 to a housing-side shaft 19 of the adapter part 9 and protects the housing 2 from penetrating substances. A second sealing element 20 is guided by a flange 21 of the adapter part 9, in the joint region thereof, to the tie rod shaft 17, and protects the joint 5.

List of Reference Numerals

1 Steering gear
2 Housing
3 Component, axially displaceable
4 End, axial
5 Joint
6 Tie rod
7 Rotational center
8 Central longitudinal axis
9 Adapter part
10 Shaft-hub connection
11 Nut
12 External thread
13 Serrated connection, conical
14 Face
15 Disk
16 Sealing element
17 Tie rod shaft
18 Sealing element
19 Shaft
20 Sealing element
21 Flange
22 Toothed rack
23 Bellows
24 Ball joint
25 Serration
26 Opening
27 Retaining strap
α Cone angle

The invention claimed is:

1. A steering gear for a power steering system, comprising a component that is mounted axially displaceably in a housing of the steering gear, a tie rod fixed in an articulated manner on at least one axial end of the component by way of a joint, with a rotational center of the joint being disposed on a radially directed adapter part laterally offset with respect to a central longitudinal axis of the axially displaceable component, and the adapter part being fixed to the axially displaceable component by way of a shaft-hub connection, which is fastened on the axial end of the axially displaceable component using a nut on an external thread, wherein the shaft-hub connection is formed by a play-free, conical serrated connection.

2. The steering gear according to claim 1, comprising a disk placed between a face of the adapter part and the nut.

3. The steering gear according to claim 1, wherein the cone angle of the shaft-hub connection is approximately 1.5° to 2.0°.

4. A steering gear according to claim 1, wherein a sealing element is slid over the adapter part from the housing of the steering gear to a tie rod shaft of the tie rod and protects the steering gear from substances penetrating from the outside and keeps substances from escaping from the inside of the housing of the steering gear.

5. A steering gear according to claim 1, wherein the axially displaceable component is a toothed rack.

6. A steering gear according to claim 4, wherein the sealing elements are bellows.

7. A steering gear according to claim 1, wherein the joint is a ball joint.

8. A steering gear according to claim 1, wherein the steering gear is installed in a power-assisted steering system of a motor vehicle.

9. A steering gear according to claim 1, wherein the steering gear is installed in a servo steering system of a motor vehicle.

10. A steering gear according to claim 1, wherein the shaft-hub connection is formed by said play-free, conical serrated connection along an entire circumference of the shaft-hub connection.

11. A steering gear for a power steering system, comprising:
    a component that is mounted axially displaceably in a housing of the steering gear;
    a tie rod fixed in an articulated manner on at least one axial end of the component by way of a joint, with a rotational center of the joint being disposed on a radially directed adapter part laterally offset with respect to a central longitudinal axis of the axially displaceable component;
    and the adapter part being fixed to the axially displaceable component by way of a shaft-hub connection, which is fastened on the axial end of the axially displaceable component using a nut on an external thread; and
    wherein the shaft-hub connection is formed by a play-free, conical serrated connection.; and
    wherein a sealing element is guided from the housing of the steering gear to a shaft of the adapter part on the shaft-hub connection, and a sealing element is guided from a joint-side flange of the adapter part to the tie rod shaft.

12. A steering gear according to claim 11, wherein the shaft-hub connection is formed by said play-free, conical serrated connection along an entire circumference of the shaft-hub connection.

13. The steering gear according to claim 11, comprising a disk placed between a face of the adapter part and the nut.

14. The steering gear according to claim 11, wherein the cone angle of the shaft-hub connection is approximately 1.5° to 2.0°.

15. A steering gear according to claim 11, wherein a sealing element is slid over the adapter part from the housing of the steering gear to a tie rod shaft of the tie rod and protects the steering gear from substances penetrating from the outside and keeps substances from escaping from the inside of the housing of the steering gear.

16. A steering gear for a power steering system, comprising a component that is mounted axially displaceably in a housing of the steering gear, a tie rod fixed in an articulated manner on at least one axial end of the component by way of a joint, with a rotational center of the joint being disposed on a radially directed adapter part laterally offset with respect to a central longitudinal axis of the axially displaceable component, and the adapter part being fixed to the axially displaceable component by way of a shaft-hub connection, which is fastened on the axial end of the axially displaceable component using a first fastening element on a second fastening element, wherein the shaft-hub connection is formed by a play-free, conical serrated connection.

17. A steering gear according to claim 16, wherein the shaft-hub connection is formed by said play-free, conical serrated connection along an entire circumference of the shaft-hub connection.

* * * * *